United States Patent [19]

Koehn

[11] Patent Number: 4,619,223

[45] Date of Patent: Oct. 28, 1986

[54] PORTABLE CORRAL FOR CATTLE AND THE LIKE

[76] Inventor: Dennis Koehn, Star Rte. Box 46A, Sublette, Kans. 67877

[21] Appl. No.: 728,691

[22] Filed: Apr. 29, 1985

[51] Int. Cl.⁴ .......................... E04H 17/18; A01K 1/02
[52] U.S. Cl. ..................................................... 119/20
[58] Field of Search ................................ 119/7, 20, 82

[56] References Cited

U.S. PATENT DOCUMENTS

| | | | |
|---|---|---|---|
| 4,201,157 | 5/1980 | Lambert | 119/20 X |
| 4,250,836 | 2/1981 | Smith | 119/20 |
| 4,366,775 | 1/1983 | Tyquin | 119/20 |
| 4,537,151 | 8/1985 | Bolton | 119/20 |

Primary Examiner—Robert P. Swiatek
Attorney, Agent, or Firm—Richard L. Miller

[57] ABSTRACT

A portable corral for cattle and the like is provided and consists of a trailer having a first opening in one side frame and a second opening in the rear frame so that the cattle may enter and egress therefrom. A solid side cover is affixed to other side frame of the trailer to reduce wind thereof. A series of panel frames are carried by the trailer and are assembled to the trailer and linked with one another to constitute the corral. Some of the panel frames are pivotally secured to the trailer for moment between retracted positions against the trailer sides and selected extended positions.

6 Claims, 4 Drawing Figures

PORTABLE CORRAL FOR CATTLE AND THE LIKE

BACKGROUND OF THE INVENTION

The instant invention relates generally to animal enclosures and more specifically it relates to a portable corral for cattle and the like.

When the cold north wind blows and the snow flies, the cattle man needs peace of mind when his cattle are out on the range. Handling cattle through the years and knowing how hard it is to set up wind breaks came the idea to build a portable unit with wheels that could be moved easily and fast.

Numerous animal enclosures have been provided in prior art that are adapted to keep livestock in mobile confinement areas. For example U.S. Pat. Nos. 3,726,256; 4,048,959 and 4,341,181; all are illustrative of such prior art. While these units may be suitable for the particular purpose to which they address, they would not be as suitable for the purposes of the present invention as heretofore described.

SUMMARY OF THE INVENTION

A principle object of the present invention is to provide a portable corral for cattle and the like that will confine the cattle within a defined area with at least one , portion of the corral including a trailer with one side being a wind break having fold up wheel assembly, so that the wind break can protect the cattle from the elements.

Another object is to provide a portable corral for cattle and the like that includes portable wing panels and removable panels which allow for a variety of corral configurations to be erected.

An additional object is to provide a portable corral for cattle and the like having the portable wing panels and the removable panels stored on the trailer so that when the wheel assembly is put in a down position the trailer can be towed by a motor vehicle to another location.

A further object is to provide a portable corral for cattle and the like that is economical in cost to manufacture.

A still further object is to provide a portable corral for cattle and the like that is simple and easy to use.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
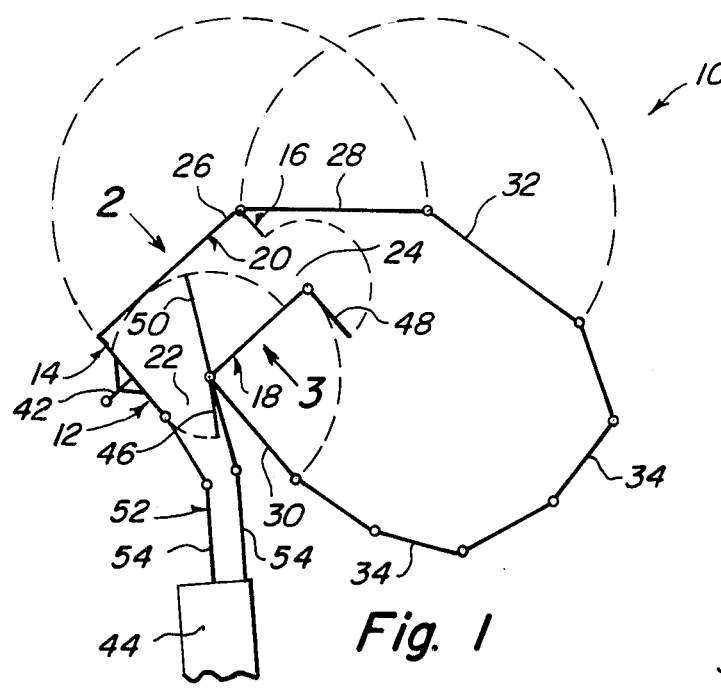
FIG. 1 is a diagrammatic top plan view of the invention.

Turning now descriptively to the drawings, in which similar reference characters denote similar elements throughout the several views, FIGS. 1 through 4 illustrate a portable corral 10 for cattle and the like.

The corral 10 consists of a trailer 12 that has a front frame 14, a rear frame 16 and two side frames 18 and 20. The trailer 12 has a first opening 22 in the first side frame 18 and a second opening 24 in the rear frame 16 so that the cattle may enter and egress therefrom. A solid side cover 26 is affixed to the second side frame 20 of the trailer 12 to reduce wind thereof.

Wing panel frames 28, 30 are each pivotally coupled to the trailer 12 with the wing panel frame 28 to side frame 20 and the wing panel frame 30 to side frame 18. Another wing panel frame 32 is pivotally coupled to wing panel frame 28.

A plurality of panel frames 34 are detachably coupled to the two wing panel frames 30 and 32 and with one another. The wing panel frames 28, 30 and 32, the panel frame 34 and the trailer 12 are aligned and combined to constitute the corral 10 for confining the cattle.

Figure 2:
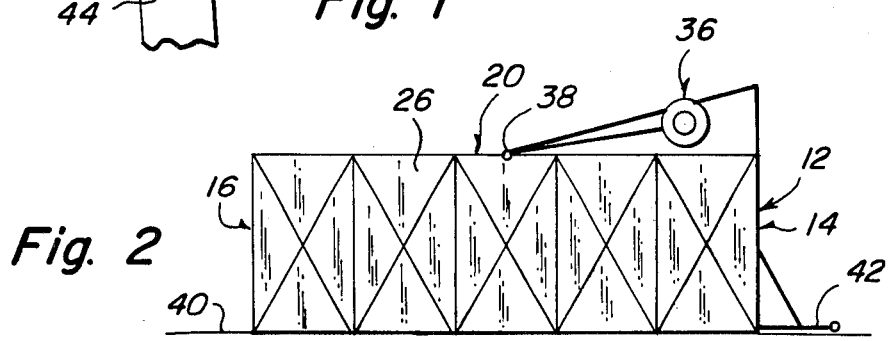
FIG. 2 is a right side view of the trailer as indicated by numeral 2 in FIG. 1 showing the solid side cover as a wind break.
Figure 3:
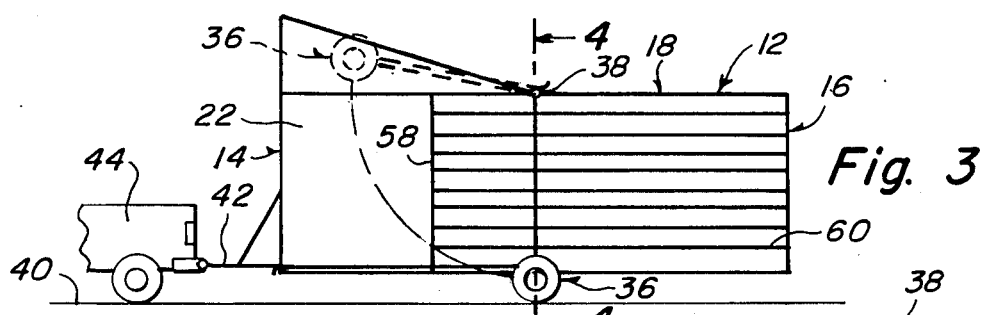
FIG. 3 is a left side view of the trailer as indicated by numeral 3 in FIG. 1 with the wheel assembly down and hitched to a motor vehicle.
Figure 4:
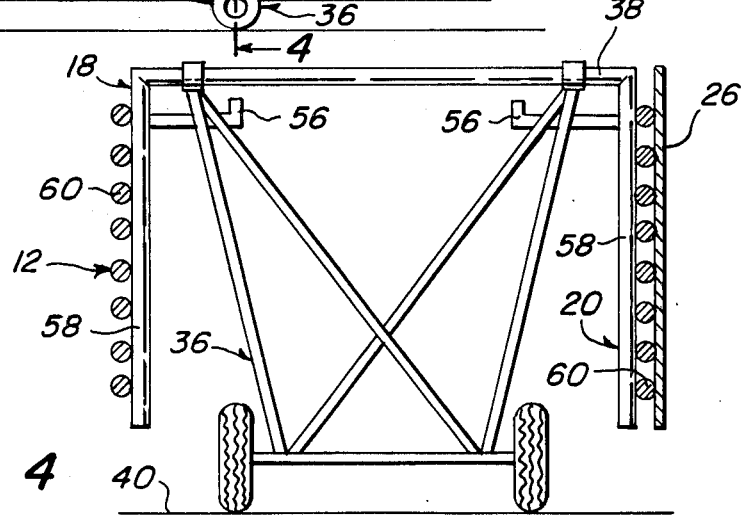
FIG. 4 is an enlarged cross sectional view taken along line 4—4 in FIG. 3 showing the wheel assembly in greater detail.

A wheel assembly 36, best seen in FIG. 4 is pivotally coupled at 38 between the side frames 18 and 20 of the trailer 12. When the wheel assembly is in an upward position, as shown in FIG. 2, the trailer 12 will sit upon the ground 40 and be used as part of the corral 10.

A hitch 42 is mounted the front frame 14 of the trailer 12. The trailer may be towed by a motor vehicle 44 when the wheel assembly 36 of the trailer is in a downward position (see FIG. 3).

The trailer 12 further contains a pair of gates 46 and 48. Gate 46 is pivotally coupled at opening 22 of the trailer while gate 48 is pivotally coupled at opening 24. When the gates 46 and 40 are closed the trailer will be made into a self-sustaining enclosure. The trailer also includes a squeeze gate 50 which is pivotally coupled inwardly at the first opening 22 in the first side frame 18. The squeeze gate 50 will divide the trailer into two parts.

The catch pen 52 is also provided and includes two sets of panel frames 54. Each set of panel frames are detachably coupled with one another and between the first opening 22 in the first side frame 18 of the trailer 12 and the motor vehicle 44. The cattle may enter the trailer from the motor vehicle.

FIG. 4 shows the trailer containing head hangers 56 affixed inwardly at spread intervals to upper portion of each of the side frames 18 and 20 for returning disassembled panel frames in vertical stacked relationships.

The front frame 14, the rear frame 16 and the two side frames 18 and 20 of the trailer each includes a plurality of spread parallel tubular columns 58. A plurality of spread parallel cross pieces 60 extend between and secured to the tubular columns 58.

The solid side cover 26 can be fabricated out of either sheet metal, building siding, heavy grade vinyl material or any other durable structures.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A portable corral for cattle and the like which comprises:
   (a) a trailer having a front frame, a rear frame and two side frames, said trailer having a first opening in said first side frame and a second opening in said rear frame so that said cattle may enter and egress therefrom;
   (b) a solid side cover affixed to said second side frame of said trailer to reduce wind thereof;
   (c) at least two wing panel frames, each of which are pivotally coupled to one of said side frames of said trailer;
   (d) a plurality of panel frames detachably coupled to said two wing panel frames and with one another wherein said wing panel frames, said panel frames and said trailer are aligned and combined to constitute said corral for confining said cattle;
   (e) a wheel assembly pivotally coupled between said side frames of said trailer so that when said wheel assembly is in an upward position said trailer will sit upon the ground and be used as part of said corral;
   (f) a hitch mounted to said front frame of said trailer so that said trailer may be towed by a motor vehicle when said wheel assembly of said trailer is in a downward position;
   (g) a pair of gates, each of which are pivotally coupled at one of said openings of said trailer so that when said gates are closed said trailer will be made into a self-sustaining enclosure;
   (h) a squeeze gate which is pivotally coupled inwardly at said first opening in said first side frame so that said squeeze gate will divide said trailer into two parts; and
   (i) a catch pen being of two sets of panel frames, each said set of panel frames detachably coupled with one another, and between said first opening in said first side frame of said trailer and said motor vehicle so that said cattle may enter said trailer from said motor vehicle.

2. A portable corral as recited in claim 1 wherein said trailer further comprises head hangers affixed inwardly at spaced intervals to upper portion of each of said side frames in vertical stacked relationships.

3. A portable collar as recited in claim 2 wherein said front frame, said rear frame and said two side frames of said trailer each comprises:
   (a) a plurality of spaced parallel tubular columns; and
   (b) a plurality of spaced parallel cross pieces extending between and secured to said tubular columns.

4. A portable corral as recited in claim 3 wherein said solid side cover is fabricated out of sheet material.

5. A portable corral as recited in claim 3 wherein said solid side cover is fabricated out of building siding.

6. A portable corral as recited in claim 3 wherein said solid side cover is fabricated out of heavy grade vinyl material.

* * * * *